United States Patent
Lee et al.

(10) Patent No.: US 11,277,855 B2
(45) Date of Patent: Mar. 15, 2022

(54) TECHNIQUES AND APPARATUSES FOR SIGNALING REGARDING CONTROL REGION SIZE

(71) Applicants: QUALCOMM Incorporated, San Diego, CA (US); Heechoon Lee, San Diego, CA (US); Jing Sun, San Diego, CA (US); Peter Gaal, San Diego, CA (US)

(72) Inventors: Heechoon Lee, San Diego, CA (US); Jing Sun, San Diego, CA (US); Peter Gaal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 153 days.

(21) Appl. No.: 16/615,103

(22) PCT Filed: Jun. 11, 2018

(86) PCT No.: PCT/CN2018/090573
§ 371 (c)(1),
(2) Date: Nov. 19, 2019

(87) PCT Pub. No.: WO2018/228305
PCT Pub. Date: Dec. 20, 2018

(65) Prior Publication Data
US 2021/0289521 A1 Sep. 16, 2021

(30) Foreign Application Priority Data
Jun. 12, 2017 (WO) ............... PCT/CN2017/087941

(51) Int. Cl.
*H04W 72/12* (2009.01)
*H04L 5/00* (2006.01)
(Continued)

(52) U.S. Cl.
CPC ....... *H04W 72/1263* (2013.01); *H04L 5/0051* (2013.01); *H04W 72/005* (2013.01);
(Continued)

(58) Field of Classification Search
CPC ......... H04W 72/1263; H04W 72/0413; H04W 72/005; H04W 72/042; H04W 72/0466;
(Continued)

(56) References Cited

U.S. PATENT DOCUMENTS

| | | | |
|---|---|---|---|
| 5,504,749 A | * | 4/1996 | Cheon ...................... H04L 29/06 370/389 |
| 2009/0175179 A1 | * | 7/2009 | Stewart ............... H04L 27/2613 370/252 |

(Continued)

FOREIGN PATENT DOCUMENTS

| | | |
|---|---|---|
| CN | 101702638 A | 5/2010 |
| CN | 101707511 A | 5/2010 |

(Continued)

OTHER PUBLICATIONS

Guangdong Oppo Mobile Telecom: "On Resource Sharing Between PDCCH and PDSCH", 3GPP TSG RAN WG1 meeting #89, 3GPP Draft; R1-1707708, 3rd Generation Partnership Project (3GPP), Mobile Competence Centre; 650, Route Des Lucioles; F-06921 Sophia-Antipolis Cedex; France, vol. RAN WG1, No. Hangzhou; PR China, May 15, 2017-May 19, 2017, 6 Pages, May 14, 2017 (May 14, 2017), XP051272912, Retrieved from the Internet: URL: http://www.3gpp.org/ftp/Meetings_3GPP_SYNC/RAN1/Docs/ [retrieved on May 14, 2017] the whole document.

(Continued)

*Primary Examiner* — Kiet Tang
(74) *Attorney, Agent, or Firm* — Harrity & Harrity, LLP

(57) ABSTRACT

Certain aspects of the present disclosure generally relate to wireless communication. In some aspects, a wireless com- (Continued)

munication device may receive at least one bit indicating a particular set of control symbols, of a plurality of sets of control symbols, comprising a downlink control region identify a location of a demodulation reference signal (DMRS), associated with a data channel, based at least in part on the at least one bit indicating the particular set of control symbols comprising the downlink control region; and communicate on the data channel based at least in part on the DMRS. Numerous other aspects are provided.

36 Claims, 8 Drawing Sheets

(51) Int. Cl.
*H04W 72/00* (2009.01)
*H04W 72/04* (2009.01)

(52) U.S. Cl.
CPC ..... *H04W 72/042* (2013.01); *H04W 72/0413* (2013.01); *H04W 72/0466* (2013.01)

(58) Field of Classification Search
CPC .............. H04W 72/12; H04W 72/1278; H04L 5/0051; H04L 5/0048
See application file for complete search history.

(56) References Cited

U.S. PATENT DOCUMENTS

| | | | |
|---|---|---|---|
| 2011/0019776 A1 | 1/2011 | Zhang et al. | |
| 2011/0170458 A1* | 7/2011 | Chen | H04B 7/155 370/279 |
| 2013/0301524 A1 | 11/2013 | Xu et al. | |
| 2014/0105165 A1 | 4/2014 | Dinan | |
| 2014/0177562 A1 | 6/2014 | Li | |
| 2016/0073415 A1 | 3/2016 | Rahman et al. | |
| 2016/0309464 A1* | 10/2016 | Mukherjee | H04W 72/1278 |
| 2018/0310283 A1* | 10/2018 | Deenoo | H04L 5/0048 |
| 2019/0306844 A1* | 10/2019 | Ganesan | H04W 72/042 |

FOREIGN PATENT DOCUMENTS

| | | |
|---|---|---|
| CN | 102036301 A | 4/2011 |
| CN | 102122984 A | 7/2011 |
| CN | 105634703 A | 6/2016 |
| CN | 106656448 A | 5/2017 |
| WO | 2012173425 A2 | 12/2012 |
| WO | WO-2018108292 A1 * | 6/2018 ............ H04W 88/02 |

OTHER PUBLICATIONS

NEC: "Control Channel Multiplexing", 3GPP Draft; TSG-RAN WG1 #50bis, R1-074167, 3rd Generation Partnership Project (3GPP), Mobile Competence Centre; 650, Route Des Lucioles; F-06921 Sophia-Antipolis Cedex; France, vol. RAN WG1, No. Shanghai, China; Oct. 8, 2007-Oct. 12, 2007, 2 Pages Oct. 2, 2007, Oct. 2, 2007 (Oct. 2, 2007), XP050107699, [retrieved on Oct. 2, 2007] the whole document.
Supplementary European Search Report—EP18817314—Search Authority—The Hague—dated Feb. 9, 2021.
International Search Report and Written Opinion—PCT/CN2018/090573—ISA/EPO—dated Aug. 30, 2018.
International Search Report and Written Opinion—PCT/CN2017/087941—ISA/EPO—dated Feb. 26, 2018.
Taiwan Search Report—TW107120140—TIPO—dated Aug. 4, 2021.

\* cited by examiner

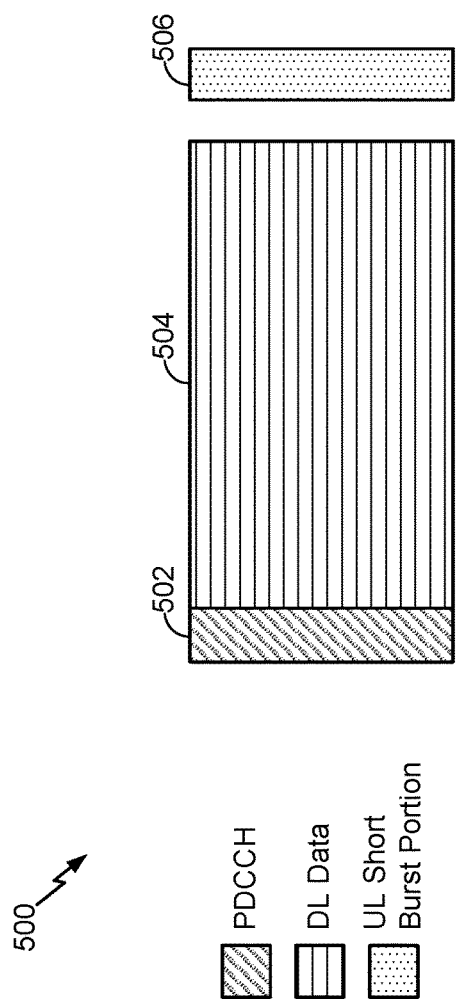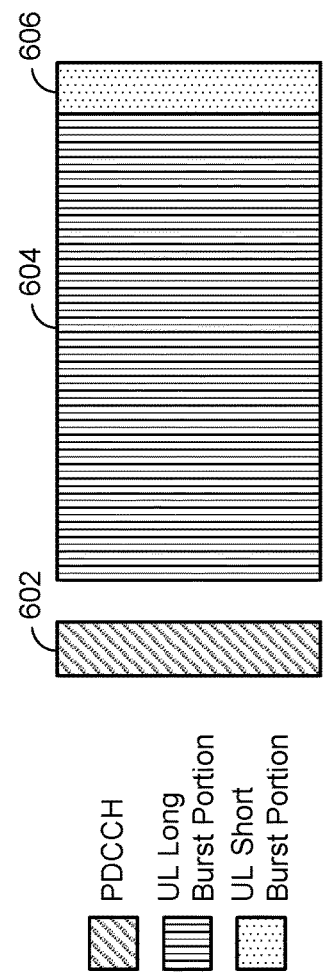

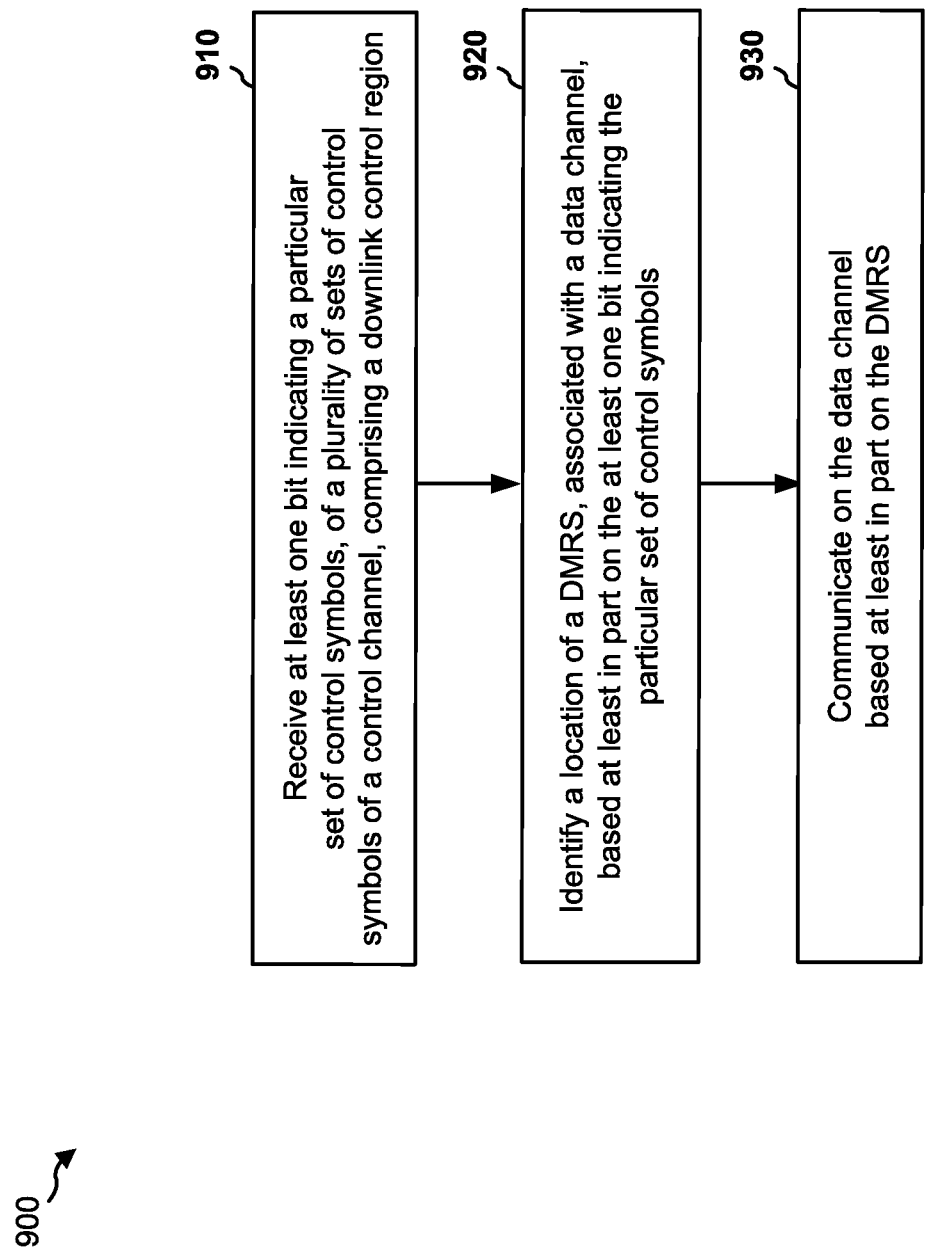

TECHNIQUES AND APPARATUSES FOR SIGNALING REGARDING CONTROL REGION SIZE

CROSS-REFERENCE TO RELATED APPLICATIONS

This application is a 371 national stage of PCT Application No. PCT/CN2018/090573 filed on Jun. 11, 2018, entitled "TECHNIQUES AND APPARATUSES FOR SIGNALING REGARDING CONTROL REGION SIZE," which claims priority to PCT Application No. PCT/CN2017/087941 filed on Jun. 12, 2017, entitled "TECHNIQUES AND APPARATUSES FOR SIGNALING REGARDING BANDWIDTH DEPENDENT CONTROL SIZE," all of which are incorporated by reference herein.

FIELD OF THE DISCLOSURE

Aspects of the present disclosure generally relate to wireless communication, and more particularly to techniques and apparatuses for signaling regarding control region size.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication may include receiving at least one bit indicating a particular set of control symbols, of a plurality of sets of control symbols, comprising a downlink control region identifying a location of a demodulation reference signal (DMRS), associated with a data channel, based at least in part on the at least one bit indicating the particular set of control symbols comprising the downlink control region; and communicating on the data channel based at least in part on the DMRS.

In some aspects, a wireless communication device may include a memory and one or more processors coupled to the memory and configured to receive at least one bit indicating a particular set of control symbols, of a plurality of sets of control symbols, comprising a downlink control region; identify a location of a DMRS, associated with a data channel, based at least in part on the at least one bit indicating the particular set of control symbols comprising the downlink control region; and communicate on the data channel based at least in part on the DMRS.

In some aspects, a non-transitory computer-readable medium may store one or more instructions for wireless communication. The one or more instructions, when executed by one or more processors of a wireless communication device, may cause the one or more processors to receive at least one bit indicating a particular set of control symbols, of a plurality of sets of control symbols, comprising a downlink control region; identify a location of a DMRS, associated with a data channel, based at least in part on the at least one bit indicating the particular set of control symbols comprising the downlink control region; and communicate.

In some aspects, an apparatus for wireless communication may include means for receiving at least one bit indicating a particular set of control symbols, of a plurality of sets of control symbols, comprising a downlink control region; means for identifying a location of a DMRS, associated with a data channel, based at least in part on the at least one bit indicating the particular set of control symbols comprising the downlink control region; and means for communicating on the data channel based at least in part on the DMRS.

Aspects generally include a method, apparatus, system, computer program product, non-transitory computer-readable medium, user equipment, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example of a downlink (DL)-centric subframe, in accordance with certain aspects of the present disclosure.

FIG. 6 is a diagram illustrating an example of an uplink (UL)-centric subframe, in accordance with certain aspects of the present disclosure.

FIG. 9 is a diagram illustrating an example process performed, for example, by a user equipment, in accordance with various aspects of the present disclosure.

DETAILED DESCRIPTION

Figure 1:
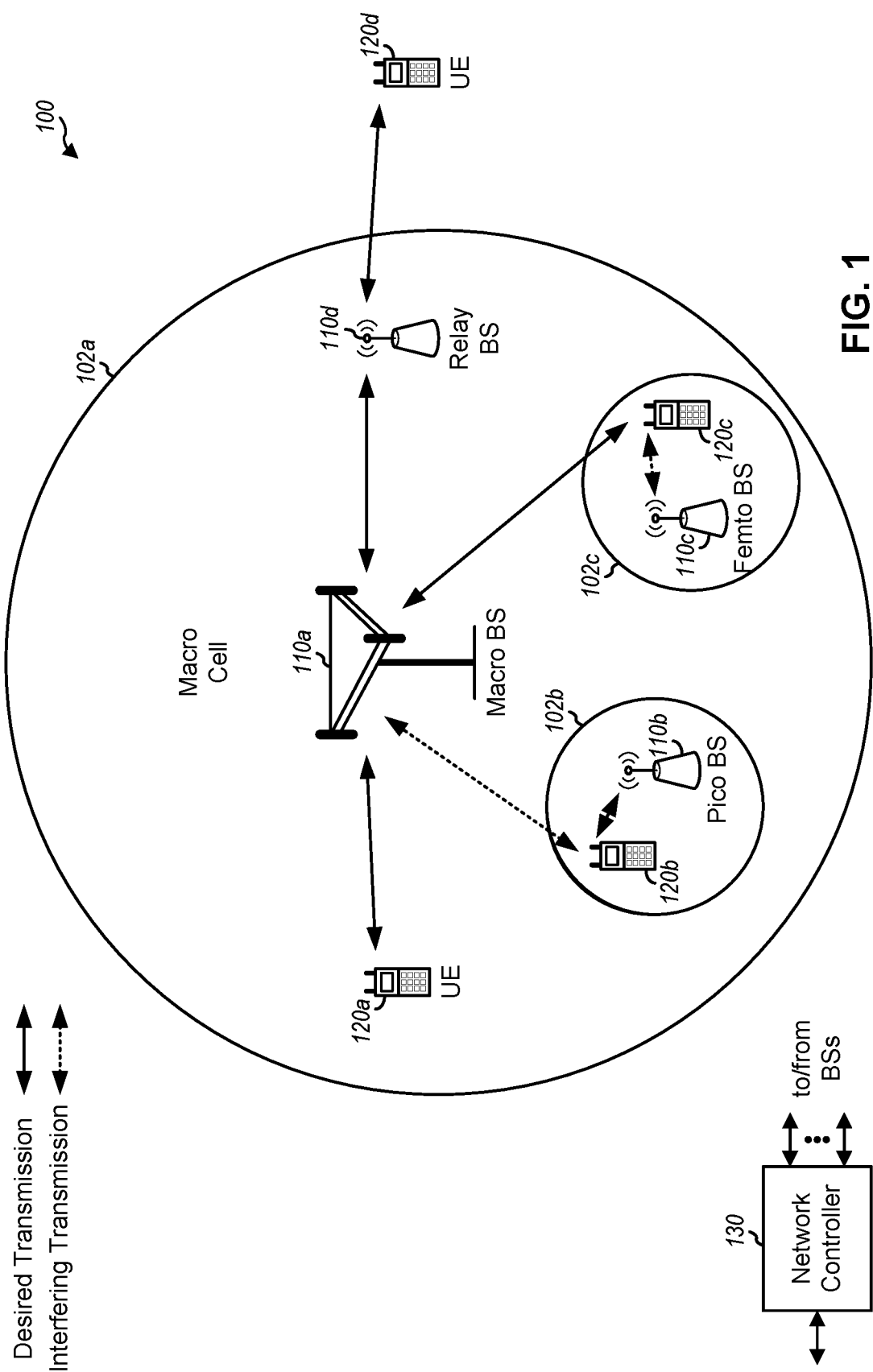
FIG. 1 is a block diagram conceptually illustrating an example of a wireless communication network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over another aspect.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), Node B (NB), gNB, 5G NB, NR BS, Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, etc.), medical devices or equipment, biometric sensors/devices, an entertainment device (e.g., music device, video device, satellite radio, gaming device, etc.), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G NB, an access point, a TRP, etc. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE). UE 120 may be included inside a housing 120' that houses components of UE 120, such as processor components, memory components, and/or the like.

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
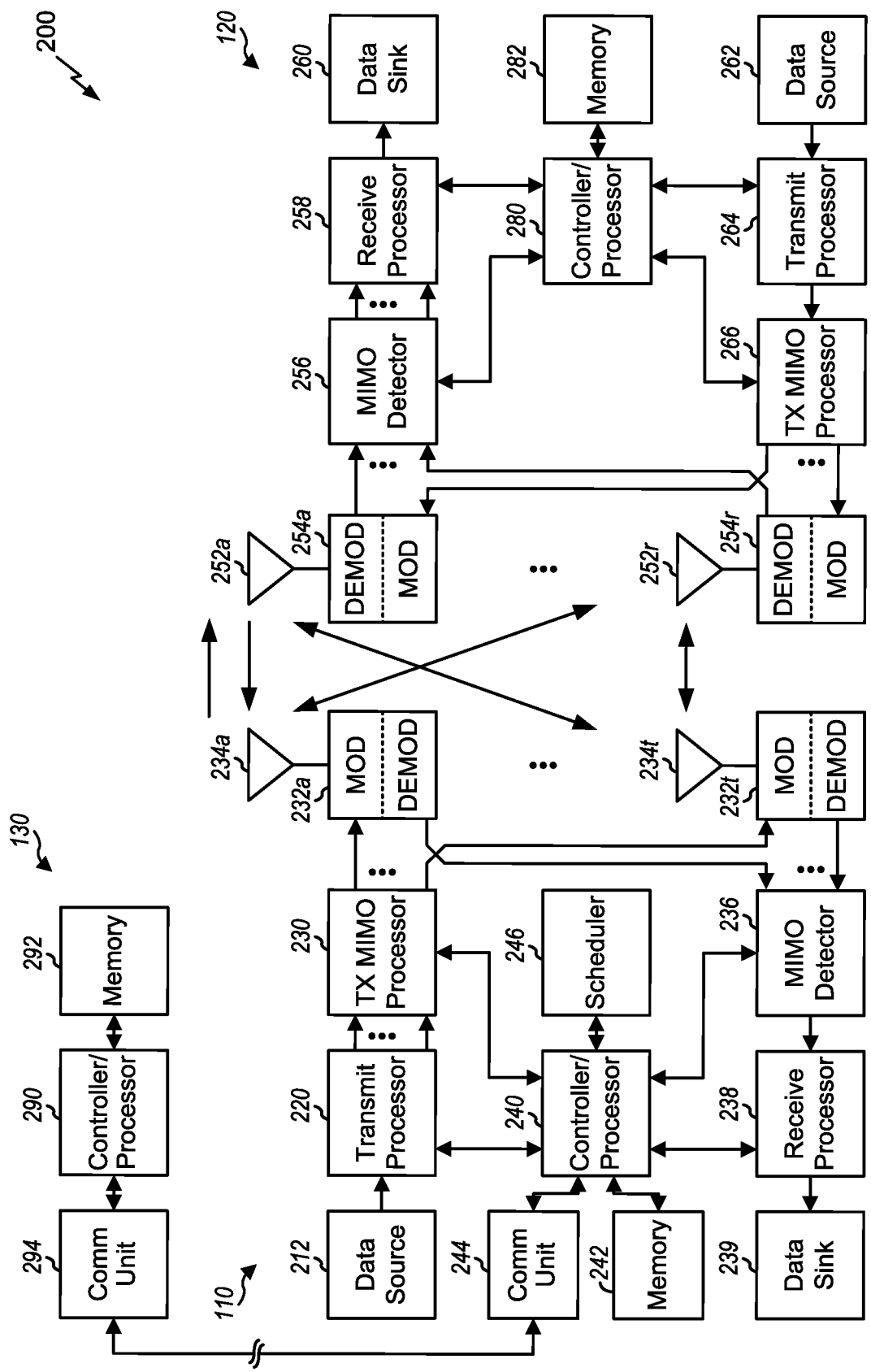
FIG. 2 shows a block diagram conceptually illustrating an example of a base station in communication with a user equipment (UE) in a wireless communication network, in accordance with certain aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controllers/processors 240 and 280 and/or any other component(s) in FIG. 2 may direct the operation at base station 110 and UE 120, respectively, to perform signaling regarding control region size, as described in more detail elsewhere herein. For example, controller/processor 240 of base station 110, controller/processor 280 of UE 120, and/or any other component(s) of FIG. 2 may perform or direct operations of, for example, process 900 of FIG. 9 and/or other processes as described herein. In some aspects, one or more of the components shown in FIG. 2 may be employed to perform example process 900, and/or other processes for the techniques described herein. Memories 242 and 282 may store data and program codes for base station 110 and UE 120, respectively. A scheduler 246 may schedule UEs for data transmission on the downlink and/or uplink.

In some aspects, UE 120 may include means for receiving at least one bit indicating a particular set of control symbols, of a plurality of sets of control symbols, comprising a downlink control region; means for identifying a location of a demodulation reference signal (DMRS), associated with a data channel, based at least in part on the at least one bit indicating the particular set of control symbols comprising the downlink control region, means for communicating on the data channel based at least in part on the DMRS, and/or the like. In some aspects, such means may include one or more components of UE 120 described in connection with FIG. 2.

As indicated above, FIG. 2 is provided merely as an example. Other examples are possible and may differ from what was described with regard to FIG. 2.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 5 and 6.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

Figure 3:
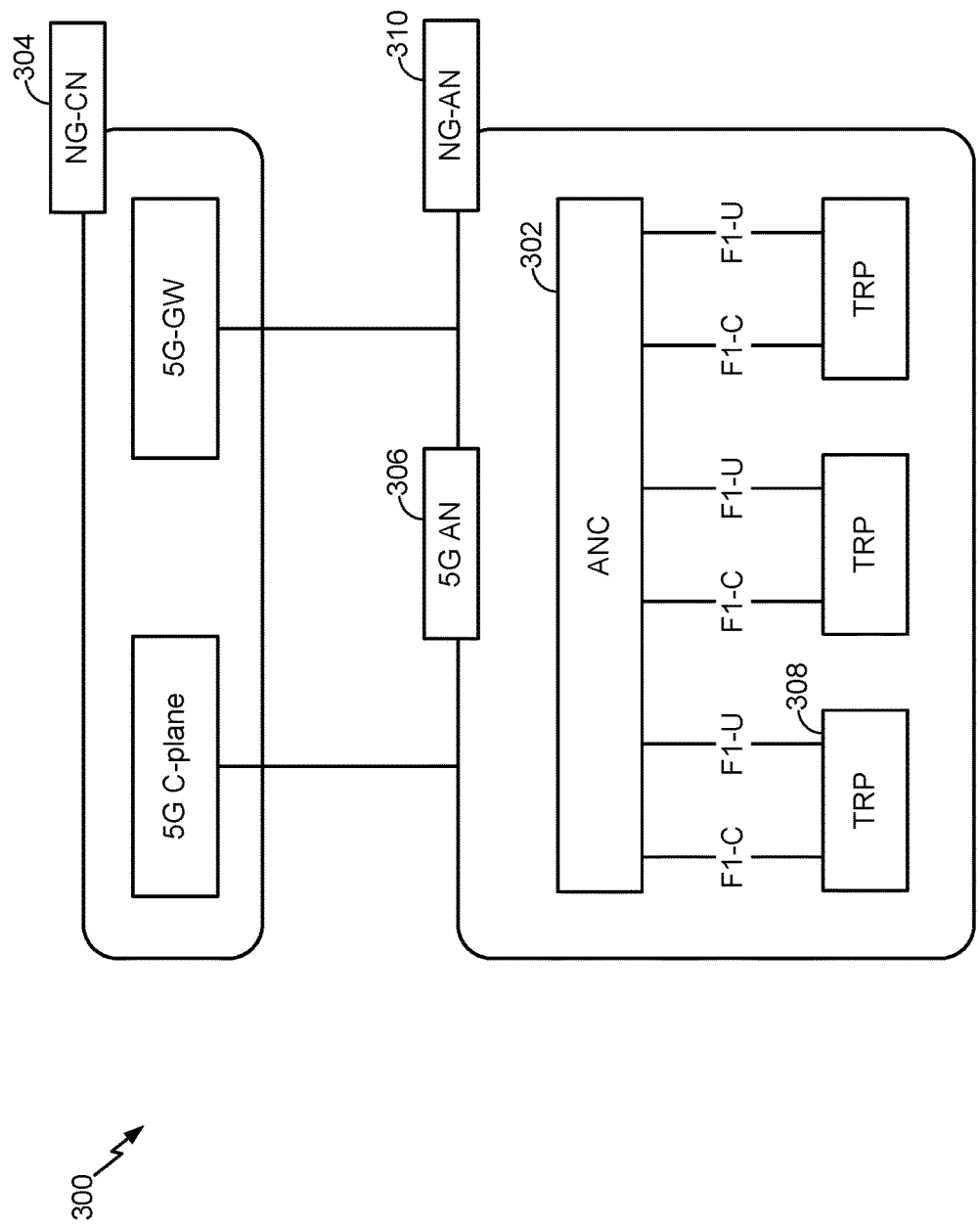
FIG. 3 illustrates an example logical architecture of a distributed radio access network (RAN), in accordance with certain aspects of the present disclosure.

FIG. 3 illustrates an example logical architecture of a distributed RAN 300, according to aspects of the present disclosure. A 3G access node 306 may include an access node controller (ANC) 302. The ANC may be a central unit (CU) of the distributed RAN 300. The backhaul interface to the next generation core network (NG-CN) 304 may terminate at the ANC. The backhaul interface to neighboring next generation access nodes (NG-ANs) may terminate at the ANC. The ANC may include one or more TRPs 308 (which may also be referred to as BSs, NR BSs, Node Bs, 3G NBs, APs, gNB, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 300 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of RAN 300. The PDCP, RLC, MAC protocol may be adaptably placed at the ANC or TRP.

According to certain aspects, a BS may include a central unit (CU) (e.g., ANC 302) and/or one or more distributed units (e.g., one or more TRPs 308).

As indicated above, FIG. 3 is provided merely as an example. Other examples are possible and may differ from what was described with regard to FIG. 3.

Figure 4:
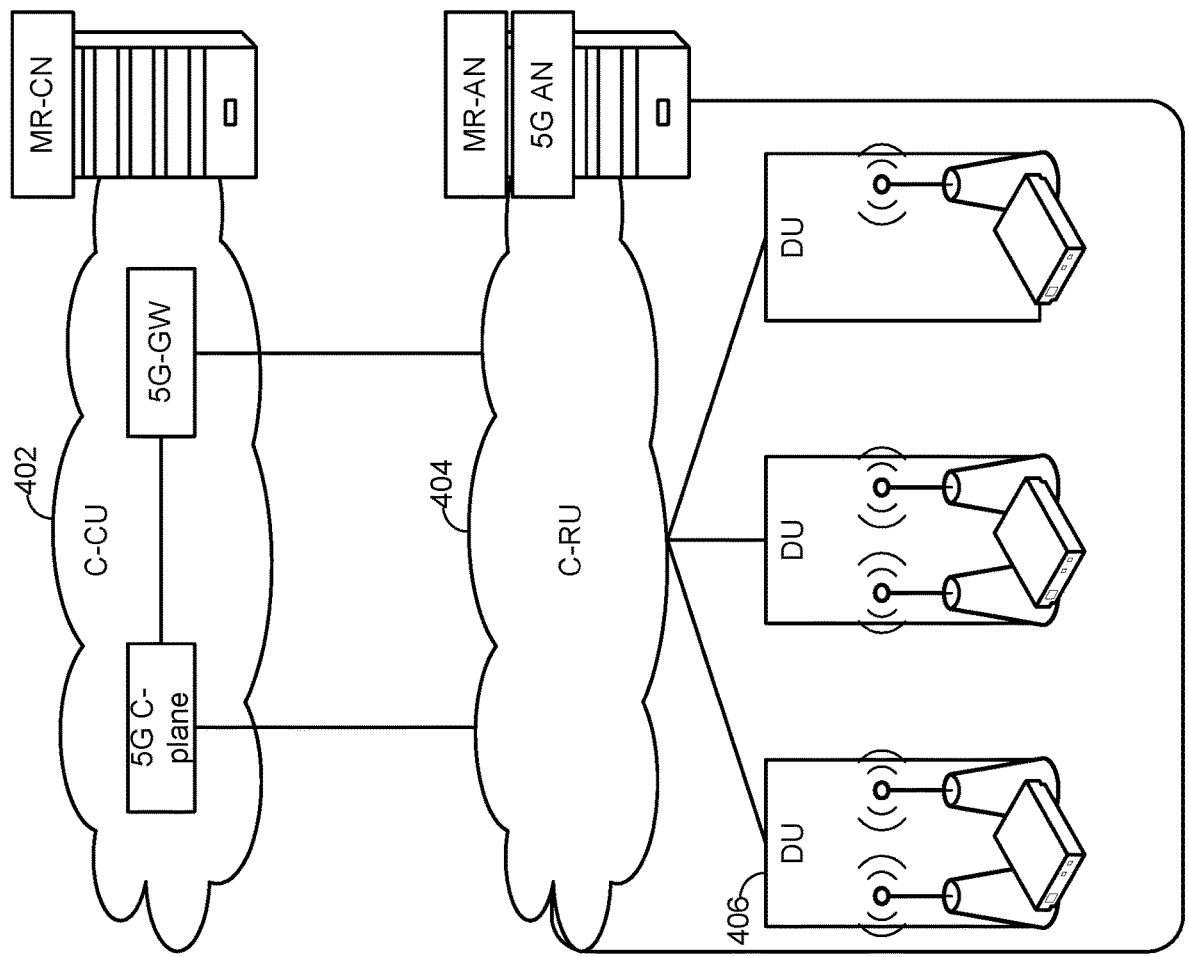
FIG. 4 illustrates an example physical architecture of a distributed RAN, in accordance with certain aspects of the present disclosure.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity.

A centralized RAN unit (C-RU) 404 may host one or more ANC functions. Optionally, the C-RU may host core network functions locally. The C-RU may have distributed deployment. The C-RU may be closer to the network edge.

A distributed unit (DU) 406 may host one or more TRPs. The DU may be located at edges of the network with radio frequency (RF) functionality.

As indicated above, FIG. 4 is provided merely as an example. Other examples are possible and may differ from what was described with regard to FIG. 4.

FIG. 5 is a diagram 500 showing an example of a DL-centric subframe or wireless communication structure. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. In some aspects, the control portion 502 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, etc.), and/or the like.

The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric subframe may also include an UL short burst portion 506. The UL short burst portion 506 may sometimes be referred to as an UL burst, an UL burst portion, a common UL burst, a short burst, an UL short burst, a common UL short burst, a common UL short burst portion, and/or various other suitable terms. In some aspects, the UL short burst portion 506 may include one or more reference signals. Additionally, or alternatively, the UL short burst portion 506 may include feedback information corresponding to various other portions of the DL-centric subframe. For example, the UL short burst portion 506 may include feedback information corresponding to the control portion 502 and/or the data portion 504. Non-limiting examples of information that may be included in the UL short burst portion 506 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 506 may include additional or alternative information, such as information pertaining to random access channel (RACH) procedures, scheduling requests, and various other suitable types of information.

As illustrated in FIG. 5, the end of the DL data portion 504 may be separated in time from the beginning of the UL short burst portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 5 is provided merely as an example. Other examples are possible and may differ from what was described with regard to FIG. 5.

FIG. 6 is a diagram 600 showing an example of an UL-centric subframe or wireless communication structure. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL long burst portion 604. The UL long burst portion 604 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL long burst portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 606. The UL short burst portion 606 in FIG. 6 may be similar to the UL short burst portion 506 described above with reference to FIG. 5, and may include any of the information described above in connection with FIG. 5. The foregoing is merely one example of an UL-centric wireless communication structure, and alternative structures having similar features may exist without necessarily deviating from the aspects described herein.

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 6 is provided merely as an example. Other examples are possible and may differ from what was described with regard to FIG. 6.

Figure 7:
FIG. 7 is a diagram illustrating an example of control region sizes, in accordance with certain aspects of the present disclosure.

FIG. 7 illustrates an example 700 of control region sizes, in accordance with aspects of the present disclosure. Reference number 702 illustrates an example system having a wider system bandwidth as compared to the narrower system bandwidth shown by reference number 704. In one aspect, the narrower system bandwidth may be associated with a bandwidth of approximately 5 MHz, and the wider system bandwidth may be associated with a bandwidth of at least approximately 10 MHz.

As shown by reference number 706, in some aspects, the wider system bandwidth 702 may include a control region comprising two downlink control symbols. For example, the wider system bandwidth 702 can be used to simultaneously convey a greater amount of information than the narrower system bandwidth 704, so fewer symbols in the time domain may be needed to convey downlink control information. In some aspects, the size of the control region (e.g., a particular set of control symbols comprising a potential search space for UE 120) may be selected from a plurality of possible sizes (e.g., a plurality of sets of control symbols), and such selection may not depend on the system bandwidth. For example, BS 110 may select the size of the control region to be two downlink control symbols (e.g., rather than three downlink control symbols) even when a narrower system bandwidth is to be used for downlink communications, in some aspects.

As shown by reference number 708, when the control region includes two downlink control symbols, a first downlink reference signal of the data channel (e.g., DMRS associated with a data channel, such as a PDSCH, a PUSCH and/or the like) is included after the maximum possible number of symbols of the downlink control channel. For example, the first downlink reference signal may be included after a last symbol of the maximum possible number of symbols, irrespective of whether all of the downlink control channel symbols are used to convey control information. This reduces complexity of signaling, implementing and processing the first DMRS. Furthermore, providing the first DMRS as soon as possible after the downlink control information enables more expedient decoding or demodulation of the downlink data information (shown by reference number 710). As further shown, in some aspects, the first DMRS may be multiplexed with downlink data information.

As shown by reference number 712, in some aspects, the narrower system bandwidth 704 may include a control region including three downlink control symbols in the downlink control information. For example, since the narrower system bandwidth 704 is associated with a narrower bandwidth than the wider system bandwidth 702, more downlink control symbols in the time domain may be needed to convey downlink control information. In some aspects, the size of the control region may be selected from a plurality of possible sizes, and such selection may not depend on the system bandwidth. For example, BS 110 may select the size of the control region to be three downlink control symbols (e.g., rather than two downlink control symbols) even when the wider system bandwidth is to be used for downlink communications, in some aspects.

As shown by reference number 714, when the control region includes three downlink control symbols, the first DMRS of the data channel (e.g., the DMRS associated with the data channel) may occur after the third downlink control symbol. For example, the first DMRS may be provided as soon as possible after the downlink control information so that the downlink data can be decoded or demodulated in a timely fashion. However, there may be a higher maximum possible number of downlink control symbols when three control symbols are used than when two control symbols are used, so the first DMRS may be provided later (in time) for cases in which three control symbols are used.

As indicated above, FIG. 7 is provided as an example. Other examples are possible and may differ from what was described with respect to FIG. 7.

A UE may communicate based at least in part on a control channel and a downlink reference signal (e.g., a DMRS). For example, the control channel may include a control region comprising a physical downlink control channel (PDCCH) and/or the like. In some cases, a BS may provide control information for multiple, different UEs on the PDCCH. For example, the BS may provide a cell that covers a group of UEs, and may provide control channel elements (CCEs) for each UE, of the group of UEs, on the PDCCH (e.g., in a common search space and/or in one or more UE-specific search spaces). A set of CCEs (whether common or UE-specific) for a particular UE is referred to herein as a control resource set, or coreset. The particular UE may listen to a first time and/or frequency resource, associated with one or more control channels, to identify the coreset, and may listen to a second time and/or frequency resource to identify the downlink reference signal. The particular UE may use the coreset to identify downlink data relevant to the particular UE, and may decode the downlink data using the downlink reference signal. The particular UE may need to identify the first time and/or frequency resource and the second time and/or frequency resource to identify the control channel and the downlink reference signal, respectively.

However, as described above, the control channel may be of different time domain sizes among different slots, subframes, and/or the like and, thus, a first downlink reference signal of the data channel may be in different time domain locations. Therefore, it may be difficult for a UE to identify which time domain resources to monitor for the control channel and the first downlink reference signal, since the control channel is used to convey information that identifies a set of control symbols that carry PDCCH.

Techniques and apparatuses, described herein, provide signaling of at least one bit that identifies a particular set of control symbols, of a plurality of sets of control symbols, that comprise a downlink control region (e.g., using a physical broadcast channel (PBCH) and/or the like). The UE may determine a time domain location of a control channel and a downlink reference signal of the UE based at least in part on the at least one bit. For example, when the at least one bit indicates a first particular set of control symbols (e.g., a set of two symbols for a control region size of two symbols), the UE may identify a first two symbols as the control channel and a third symbol as a location of the downlink reference signal. When the at least one bit indicates a second particular set of control symbols (e.g., a set of three symbols for a control region size of three symbols), the UE may identify a first three symbols as the control channel and a fourth symbol as a location of the downlink reference signal. As used herein, "system bandwidth" is intended to be synonymous with "channel bandwidth."

Thus, a scheduling entity (e.g., a BS and/or the like) can provide downlink reference signals sooner for control regions having a comparatively smaller size than for control regions having a comparatively larger size by signaling a set of control symbols, which improves demodulation performance for UEs. In some aspects, information identifying the particular set of control symbols that comprise the potential search space (e.g., a size of the control region) may be provided in association with information identifying particular control symbols to be used by a BS to convey control information (e.g., a subset of the particular set of control symbols), which saves resources of the UE that would otherwise be used to scan the entirety of the control region.

Figure 8:
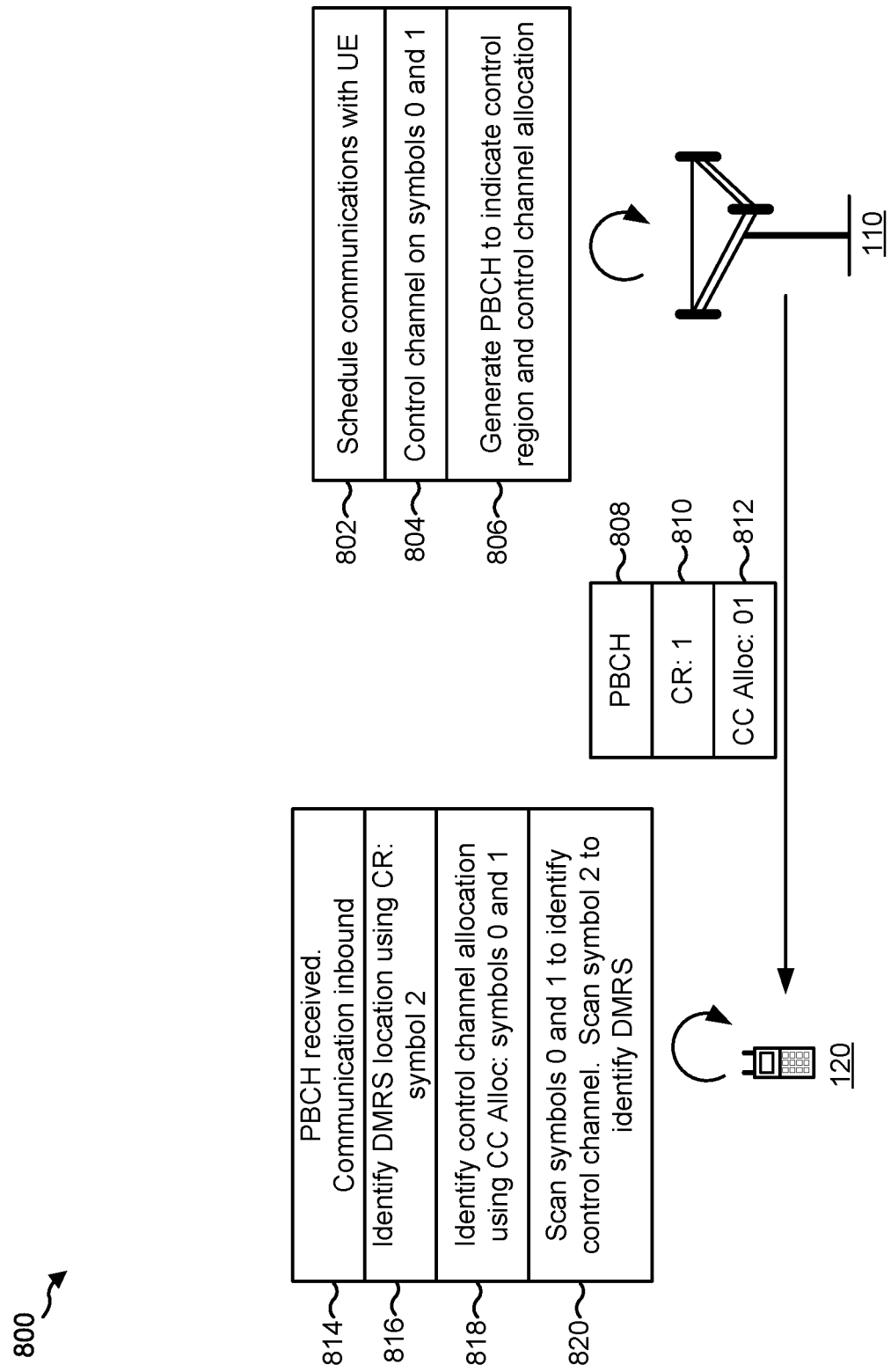
FIG. 8 is a diagram illustrating an example of signaling for control region sizes, in accordance with various aspects of the present disclosure.

FIG. 8 is a diagram of an example 800 of signaling for control region size, in accordance with certain aspects of the present disclosure.

As shown in FIG. 8, and by reference number 802, a BS 110 may determine to schedule communications with a UE 120 (e.g., using a wide system bandwidth or a narrow system bandwidth). As shown by reference number 804, the BS 110 may determine that a control channel is to be provided on symbols 0 and 1 (e.g., a first two symbols) of a subframe or slot (e.g., the subframe or slot described in connection with FIGS. 5, 6, and/or 7, above). For example, the BS 110 may select a size of the control region (e.g., a size of a PDCCH) from a plurality of possible control region sizes (e.g., the BS 110 may select a size of two control symbols or a size of three control symbols). In this example, the BS 110 selects the size of the control region to be two control symbols and, therefore, determines that the control channel is to be provided on symbols 0 and 1 since the associated maximum possible number of control symbols is two control symbols. In some aspects, the BS 110 may determine that fewer than the maximum possible number of control symbols are to be used, and may accordingly schedule a control channel of the UE 120 on fewer than the maximum possible number of control symbols (e.g., on symbol 0, on symbol 1, and/or the like).

As shown by reference number 806, the BS 110 may generate and transmit a physical broadcast channel (PBCH) to indicate a control region (e.g., a particular set of control symbols that correspond to the selected control region size, where the particular set of control symbols comprise a potential search space for the UE 120) and a control channel allocation of the UE 120. For example, the BS 110 may indicate the control region (e.g., the particular set of control symbols) so that the UE 120 can determine the maximum possible number of control symbols. When the UE 120 knows the maximum possible number of control symbols, the UE 120 may identify a DMRS location based at least in part on the maximum possible number of control symbols. Further, the BS 110 may indicate a control channel allocation, which may identify particular control symbols that are used to carry a control channel of the UE 120.

As shown by reference number 808, the BS 110 may transmit the PBCH. As shown by reference number 810, the PBCH may indicate a control region of 1. In FIG. 8, the control region of 1 corresponds to a control region comprising two control symbols. In some aspects, the information indicating the particular set of control symbols that form the potential search space (i.e., the downlink control region) may be conveyed by at least one bit. For example, in FIG. 8, a single bit with a value of 1 indicates that two control symbols are included in the control region. Conversely, if the single bit were a value of 0, this may indicate that three control symbols are included in the control region. In some aspects, more than a single bit may be used to convey the information indicating the particular set of control symbols that form the potential search space.

As shown by reference number 812, in some aspects, the PBCH may indicate a control channel allocation. The control channel allocation may identify a location of a search space (e.g., a common search space or a UE-specific search space) or a coreset in a time domain. In FIG. 8, the PBCH indicates a control channel allocation of 01. For example, in some aspects, the control channel allocation may be identified by two bits. As one possible aspect, when the size of the control region is two control symbols, the two bits may indicate whether the UE 120 is to use a first, second, or third control channel allocation (e.g., symbol 0, symbol 1, or symbols 0 and 1). This approach may be more flexible than using a single bit to indicate the control channel allocation. For example, the single bit may indicate whether the UE 120 is to use a first control channel allocation or a second control channel allocation (e.g., symbol 0 or symbols 0 and 1).

As another possible aspect, when the size of the control region is three control symbols, the two bits may indicate whether the UE 120 is to use a first, second, or third control channel allocation (e.g., symbols 0 and 1, symbols 1 and 2, or symbols 0, 1, and 2). This approach may be more flexible than using a single bit to indicate the control channel allocation. For example, the single bit may indicate whether the UE 120 is to use a first control channel allocation or a second control channel allocation (e.g., symbols 0 and 1 or symbols 0, 1, and 2).

In some aspects, the PBCH may provide information associated with the downlink control region (e.g., information that identifies a potential search space or a coreset) time domain location in another fashion. For example, the PBCH may indicate a start symbol and an end symbol of the search space or the coreset.

In some aspects, the BS 110 may provide information indicating a time domain location of the DMRS. For example, the BS 110 may provide the information indicating the time location of the DMRS in the PBCH. Additionally, or alternatively, the BS 110 may provide the information indicating the time domain location of the DMRS on a downlink control channel in the common search space (e.g., as part of the DCI).

As shown by reference number 814, the UE 120 may receive the PBCH. As further shown, the UE 120 may determine that a communication is inbound (e.g., based at least in part on receiving the PBCH). As shown by reference number 816, the UE 120 may identify a DMRS location of the communication. In some aspects, the UE 120 may identify the DMRS location based at least in part on the at least one bit indicating the particular set of control symbols comprising the control region. For example, the DMRS may be located after a last symbol of the control region (e.g., a last symbol after the maximum possible number of control symbols of the communication). Here, the UE 120 may determine the maximum possible number of control symbols associated with the control region (e.g., two, corresponding to control symbols 0 and 1) based at least in part on the at least one bit indicating the particular set of control symbols, and may determine that the DMRS is located at symbol 2.

As shown by reference number 818, the UE 120 may identify a control channel allocation using the control channel allocation information included in the PBCH. Here, the UE 120 identifies control symbols 0 and 1 (e.g., the maximum possible number of control symbols). As shown by reference number 820, the UE 120 may scan control symbols 0 and 1 to identify a control channel of the UE 120 (e.g., a coreset and/or the like), and may scan symbol 2 (e.g., a first symbol after the maximum possible number of control symbols) to identify the DMRS. In some aspects, the UE may communicate on the data channel based at least in part on the DMRS. For example, the UE may use the DMRS in order to decode a PDSCH transmission received from the BS 110.

The example of FIG. 8 was described in the context of a control region comprising two control symbols. In some aspects, the UE 120 may operate with a control region of another size. For example, the UE 120 may receive information indicating another particular set of control symbols (e.g., a set of three control symbols) is included in the control region (e.g., rather than two control symbols) and identify a location of the DMRS based at least in part on the indication, accordingly.

As indicated above, FIG. 8 is provided as an example. Other examples are possible and may differ from what is described in connection with FIG. 8.

FIG. 9 is a diagram illustrating an example process 900 performed, for example, by a wireless communication device, in accordance with various aspects of the present disclosure. Example process 900 is an example where a wireless communication device (e.g., UE 120) communicates based at least in part on signaling for control region size.

As shown in FIG. 9, in some aspects, process 900 may include receiving at least one bit indicating a particular set of control symbols, of a plurality of sets of control symbols, comprising a downlink control region (block 910). For example, the wireless communication device (e.g., UE 120, using antenna 252, DEMOD 254, receive processor 258, controller/processor 280, and/or the like) may receive at least one bit indicating a particular set of control symbols, of a plurality of sets of control symbols, comprising a downlink control region, as described above.

As shown in FIG. 9, in some aspects, process 900 may include identifying a location of a DMRS, associated with a data channel, based at least in part on the at least one bit indicating the particular set of control symbols (block 920). For example, the wireless communication device (e.g., UE 120, using receive processor 258, controller/processor 280, and/or the like) may identify a location of a DMRS, associated with a data channel (e.g., a PDSCH, a PUSCH, and/or the like), based at least in part on the at least one bit indicating the particular set of control symbols, as described above.

As shown in FIG. 9, in some aspects, process 900 may include communicating on the data channel based at least in part on the DMRS (block 930). For example, the wireless communication device (e.g., UE 120, using antenna 252, receive processor 258, controller/processor 280, and/or the like) may communicate on the data channel based at least in part on the DMRS, as described above. Process 900 may include additional aspects, such as any single aspect or any combination of aspects described below and/or in connection with one or more other processes described elsewhere herein.

In some aspects, the particular set of control symbols identifies a maximum length of a physical downlink control channel (PDCCH), wherein the location of the DMRS is identified based at least in part on the maximum length of the PDCCH.

In some aspects, the at least one bit is a single bit and a value of the single bit indicates whether the particular set of control symbols is a first set of control symbols, of the plurality of sets of control symbols, or a second set of control symbols of the plurality of sets of control symbols. In some aspects, the first set of control symbols includes two control symbols and the second set of control symbols includes three control symbols.

In some aspects, the at least one bit includes two bits and values of the two bits indicate whether the particular set of control symbols is a first set of control symbols of the plurality of sets of control symbols, a second set of control symbols of the plurality of sets of control symbols, or a third set of control symbols of the plurality of sets of control symbols.

In some aspects, the at least one bit identifies a start symbol of the particular set of control symbols and an end symbol of the particular set of control symbols.

In some aspects, the at least one bit is received in a physical broadcast channel (PBCH). In some aspects, the downlink control region includes a common search space. In some aspects, the downlink control region includes a user equipment (UE)-specific search space.

In some aspects, the data channel is a physical downlink shared channel (PDSCH) or a physical uplink shared channel (PUSCH).

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method for wireless communication performed by a wireless communication device, comprising:
receiving at least one bit indicating a particular set of control symbols, of a plurality of sets of control symbols, comprising a downlink control region;
identifying a location of a demodulation reference signal (DMRS), associated with a data channel, based at least in part on a maximum possible number of control symbols associated with the at least one bit indicating the particular set of control symbols comprising the downlink control region; and
communicating on the data channel based at least in part on the DMRS.

2. The method of claim 1, wherein the particular set of control symbols identifies a maximum length of a physical downlink control channel (PDCCH),
wherein the maximum possible number of control symbols is associated with the maximum length of the PDCCH, and wherein the location of the DMRS is identified based at least in part on the maximum length of the PDCCH.

3. The method of claim 1, wherein the at least one bit is a single bit and a value of the single bit indicates whether the particular set of control symbols is a first set of control symbols, of the plurality of sets of control symbols, or a second set of control symbols of the plurality of sets of control symbols.

4. The method of claim 3, wherein the first set of control symbols includes two control symbols and the second set of control symbols includes three control symbols.

5. The method of claim 1, wherein the at least one bit identifies a start symbol of the particular set of control symbols and an end symbol of the particular set of control symbols.

6. The method of claim 1, wherein the at least one bit is received in a physical broadcast channel (PBCH).

7. The method of claim 1, wherein the downlink control region includes a common search space.

8. The method of claim 1, wherein the downlink control region includes a user equipment (UE)-specific search space.

9. The method of claim 1, wherein the data channel is a physical downlink shared channel (PDSCH) or a physical uplink shared channel (PUSCH).

10. A wireless communication device, comprising:
a memory; and
one or more processors coupled to the memory, the one or more processors configured to:
receive at least one bit indicating a particular set of control symbols, of a plurality of sets of control symbols, comprising a downlink control region;
identify a location of a demodulation reference signal (DMRS), associated with a data channel, based at least in part on a maximum possible number of control symbols associated with the at least one bit indicating the particular set of control symbols comprising the downlink control region; and
communicate on the data channel based at least in part on the DMRS.

11. The wireless communication device of claim 10, wherein the particular set of control symbols identifies a maximum length of a physical downlink control channel (PDCCH),
wherein the maximum possible number of control symbols is associated with the maximum length of the PDCCH, and
wherein the location of the DMRS is identified based at least in part on the maximum length of the PDCCH.

12. The wireless communication device of claim 10, wherein the at least one bit is a single bit and a value of the single bit indicates whether the particular set of control symbols is a first set of control symbols, of the plurality of sets of control symbols, or a second set of control symbols of the plurality of sets of control symbols.

13. The wireless communication device of claim 12, wherein the first set of control symbols includes two control symbols and the second set of control symbols includes three control symbols.

14. The wireless communication device of claim 10, wherein the at least one bit identifies a start symbol of the particular set of control symbols and an end symbol of the particular set of control symbols.

15. The wireless communication device of claim 10, wherein the at least one bit is received in a physical broadcast channel (PBCH).

16. The wireless communication device of claim 10, wherein the downlink control region includes a common search space.

17. The wireless communication device of claim 10, wherein the downlink control region includes a user equipment (UE)-specific search space.

18. The wireless communication device of claim 10, wherein the data channel is a physical downlink shared channel (PDSCH) or a physical uplink shared channel (PUSCH).

19. A non-transitory computer-readable medium storing one or more instructions for wireless communication, the one or more instructions comprising:
one or more instructions that, when executed by one or more processors of a wireless communication device, cause the one or more processors to:
receive at least one bit indicating a particular set of control symbols, of a plurality of sets of control symbols, comprising a downlink control region;
identify a location of a demodulation reference signal (DMRS), associated with a data channel, based at least in part on a maximum possible number of control symbols associated with the at least one bit indicating the particular set of control symbols comprising the downlink control region; and
communicate on the data channel based at least in part on the DMRS.

20. The non-transitory computer-readable medium of claim 19, wherein the particular set of control symbols identifies a maximum length of a physical downlink control channel (PDCCH),
wherein the maximum possible number of control symbols is associated with the maximum length of the PDCCH, and
wherein the location of the DMRS is identified based at least in part on the maximum length of the PDCCH.

21. The non-transitory computer-readable medium of claim 19, wherein the at least one bit is a single bit and a value of the single bit indicates whether the particular set of control symbols is a first set of control symbols, of the plurality of sets of control symbols, or a second set of control symbols of the plurality of sets of control symbols.

22. The non-transitory computer-readable medium of claim 21, wherein the first set of control symbols includes two control symbols and the second set of control symbols includes three control symbols.

23. The non-transitory computer-readable medium of claim 19, wherein the at least one bit identifies a start symbol of the particular set of control symbols and an end symbol of the particular set of control symbols.

24. The non-transitory computer-readable medium of claim 19, wherein the at least one bit is received in a physical broadcast channel (PBCH).

25. The non-transitory computer-readable medium of claim 19, wherein the downlink control region includes a common search space.

26. The non-transitory computer-readable medium of claim 19, wherein the downlink control region includes a user equipment (UE)-specific search space.

27. The non-transitory computer-readable medium of claim 19, wherein the data channel is a physical downlink shared channel (PDSCH) or a physical uplink shared channel (PUSCH).

28. An apparatus for wireless communication, comprising:
  means for receiving at least one bit indicating a particular set of control symbols, of a plurality of sets of control symbols, comprising a downlink control region;
  means for identifying a location of a demodulation reference signal (DMRS), associated with a data channel, based at least in part on a maximum possible number of control symbols associated with the at least one bit indicating the particular set of control symbols comprising the downlink control region; and
  means for communicating on the data channel based at least in part on the DMRS.

29. The apparatus of claim 28, wherein the particular set of control symbols identifies a maximum length of a physical downlink control channel (PDCCH),
  wherein the maximum possible number of control symbols is associated with the maximum length of the PDCCH, and
  wherein the location of the DMRS is identified based at least in part on the maximum length of the PDCCH.

30. The apparatus of claim 28, wherein the at least one bit is a single bit and a value of the single bit indicates whether the particular set of control symbols is a first set of control symbols, of the plurality of sets of control symbols, or a second set of control symbols of the plurality of sets of control symbols.

31. The apparatus of claim 30, wherein the first set of control symbols includes two control symbols and the second set of control symbols includes three control symbols.

32. The apparatus of claim 28, wherein the at least one bit identifies a start symbol of the particular set of control symbols and an end symbol of the particular set of control symbols.

33. The apparatus of claim 28, wherein the at least one bit is received in a physical broadcast channel (PBCH).

34. The apparatus of claim 28, wherein the downlink control region includes a common search space.

35. The apparatus of claim 28, wherein the downlink control region includes a user equipment (UE)-specific search space.

36. The apparatus of claim 28, wherein the data channel is a physical downlink shared channel (PDSCH) or a physical uplink shared channel (PUSCH).

* * * * *